(12) United States Patent
Itou

(10) Patent No.: US 8,457,268 B2
(45) Date of Patent: Jun. 4, 2013

(54) COMMUNICATION SYSTEM HAVING COMMUNICATION DEVICES CAPABLE OF SYNCHRONOUS COMMUNICATION THEREBETWEEN

(75) Inventor: Akito Itou, Kariya (JP)

(73) Assignee: Denso Corporation, Kariya (JP)

( * ) Notice: Subject to any disclaimer, the term of this patent is extended or adjusted under 35 U.S.C. 154(b) by 395 days.

(21) Appl. No.: 12/872,670

(22) Filed: Aug. 31, 2010

(65) Prior Publication Data
US 2011/0051870 A1 Mar. 3, 2011

(30) Foreign Application Priority Data
Aug. 31, 2009 (JP) ................................. 2009-200427

(51) Int. Cl.
*H04L 7/00* (2006.01)
(52) U.S. Cl.
USPC ........... 375/356; 375/295; 375/316; 375/354; 375/359; 375/365
(58) Field of Classification Search
USPC ................. 375/219, 222, 293, 295, 316, 354, 375/356, 358, 359, 362, 365, 368
See application file for complete search history.

(56) References Cited

U.S. PATENT DOCUMENTS

| 5,812,835 | A | 9/1998 | Ruuskanen | |
|---|---|---|---|---|
| 5,828,871 | A | 10/1998 | Kawaguchi et al. | |
| 8,028,112 | B2 * | 9/2011 | Amagai | 710/110 |
| 8,165,170 | B2 * | 4/2012 | Closset et al. | 370/503 |
| 8,179,950 | B2 * | 5/2012 | Agazzi et al. | 375/220 |
| 8,234,395 | B2 * | 7/2012 | Millington | 709/231 |
| 2009/0022255 | A1 * | 1/2009 | Kanekawa et al. | 375/356 |
| 2010/0199006 | A1 * | 8/2010 | Takeuchi | 710/107 |
| 2011/0035511 | A1 * | 2/2011 | Biederman | 709/248 |
| 2011/0289593 | A1 * | 11/2011 | Deas et al. | 726/26 |
| 2012/0159026 | A1 * | 6/2012 | Kataoka et al. | 710/110 |

FOREIGN PATENT DOCUMENTS

| JP | H08-139713 | 5/1996 |
|---|---|---|
| JP | H08-221315 | 8/1996 |
| JP | 8-237235 | 9/1996 |
| JP | 9-507932 | 2/1999 |
| JP | 11-68862 | 3/1999 |
| JP | 2006-148348 | 6/2006 |
| WO | WO2009/014182 | * 1/2009 |

OTHER PUBLICATIONS

Japanese Office Action dated Jul. 5, 2011, issued in corresponding Japanese Application No. 2009-200427 with English Translation.

* cited by examiner

*Primary Examiner* — Hirdepal Singh
(74) *Attorney, Agent, or Firm* — Nixon & Vanderhye PC

(57) ABSTRACT

There is provided a communication system that includes master and slave communication ECUs. The master communication ECU sends a clock signal to a clock communication line, with which the communication ECUs synchronize with each other when sending and receiving data. The master and slave communication ECUs then receive the clock signal through the clock line. The ECUs use the received clock signal as a reference timing, which is designated as a transmission/reception reference, and send or receive data to/from data communication lines.

12 Claims, 4 Drawing Sheets

COMMUNICATION SYSTEM HAVING COMMUNICATION DEVICES CAPABLE OF SYNCHRONOUS COMMUNICATION THEREBETWEEN

CROSS REFERENCE TO RELATED APPLICATION

This application is based on and claims the benefit of priority from earlier Japanese Patent Application No. 2009-200427 filed on Aug. 31, 2009, the description of which is incorporated herein by reference.

BACKGROUND OF THE INVENTION

1. Field of the Invention

The present invention relates to a communication system and a communication device, particularly to a communication system having a plurality of communication devices each of which is connected to a plurality of communication lines, and a communication device composing the communication system.

2. Description of the Related Art

There are various types of communication systems used for conducting communications among a plurality of communication devices. One well-known type of communication system among them consists of a plurality of communication devices each of which is connected with a plurality of communication lines. In such a communication system, the plurality of communication devices conduct serial communications with one another by sending and receiving data when a clock signal that has been sent from one of the devices is received by the rest of the devices. In this system, in general, for the communication device that sends the clock signal, the time at which the clock signal is sent is determined as a reference timing (transmission/reception reference) for sending and receiving data, while for the communication devices that receive the clock signal, the time at which the clock signal is received is determined as the reference timing (transmission/reception reference) for sending and receiving data. Therefore, there is a time delay between the time at which the clock signal is sent from the communication device and the time at which the clock signal is received by the other communication devices, which causes a time lag among the communication devices in their transmission/reception reference.

When the time lag in their transmission/reception reference becomes significant, data may fail to reach a communication device when the device is ready to read the data, or the communication devices fail to synchronize with one another. In order to overcome this problem, such a communication system has been disclosed in Japanese Unexamined Patent Publication No. 1999-068862 that is provided with a correction circuit which is adapted to correct the time lag in the transmission/reception reference.

However, this communication system has to include the correction circuit that is an unneeded component for the purpose of conducting communications in the communication system. Thus, such a circuit causes the communication system to become bulky, and increases the manufacturing cost of the system.

SUMMARY OF THE INVENTION

The present invention has been made in view of such problems, and it is therefore an object of the invention to provide a communication system that is designed to reduce the amount of time lag in the reference timing used for data transmission on the basis of a clock signal that is transmitted to a plurality of communication devices, without using a correction circuit.

In order to achieve the above object, a communication system according to the present invention includes a plurality of communication devices, one of which is designated as a master device. The master device includes a clock transmission means that sends a clock signal to a clock communication line, one of a plurality of communication lines. The clock signal is used to synchronize the plurality of communication devices when they send or receive data. All of the communication devices, which conduct communications through data communication lines excluding the clock communication line, include a clock reception means for receiving the clock signal through the clock communication line, and a data transmission/reception means for sending and receiving data to/from the data communication lines based on the clock signal that they have received. The received clock signal is determined as the reference timing (transmission/reception reference) for sending and receiving data.

The above wording of "All of the communication devices, which conduct communications through data communication lines" designates all of the communication devices among the plurality of communication devices that compose the communication system and may or may not include the master device.

In this communication system of the invention, all communication devices capable of sending and receiving data (with a data transmission/reception means), among the plurality of communication devices composing the communication system, use the clock signal received through the clock communication line as the transmission/reception reference when sending and receiving data. That is, in this communication system, the received clock signal is used as the transmission/reception reference.

If the master device for sending a clock signal is also designed to send and receive data through the data lines, the master device also uses the clock signal received from the clock signal line as the transmission/reception reference, like the rest of the communication devices.

According to this communication system, all of the communication devices for sending and receiving data are adapted to use the clock signal received through the clock signal line as the transmission/reception reference, so that the amount of time lag among the communication devices can be reduced, compared to a system having communication devices where the transmission/reception reference is determined by the time at which the clock signal is sent. Further, the communication system of the invention does not include a circuit exclusively used for correcting the time lag of the transmission/reception reference. This can reduce the production cost of the communication system.

BRIEF DESCRIPTIONS OF THE DRAWINGS

DETAILED DESCRIPTION OF THE PREFERRED EMBODIMENTS

A preferred embodiment of the present invention will be described with reference to the drawings.

(First Embodiment)

Figure 1:
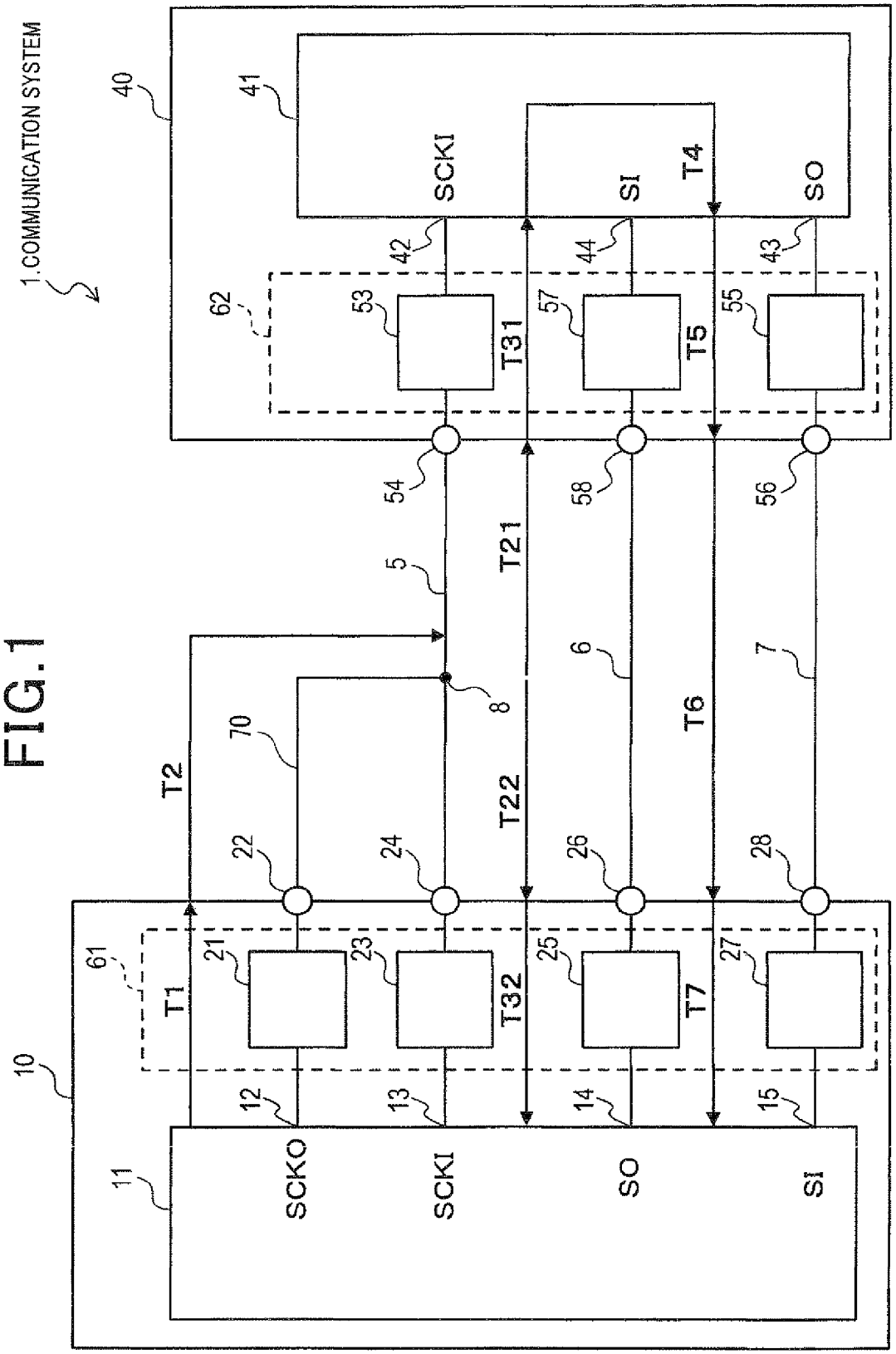
FIG. 1 is a block diagram showing a schematic structure of a communication device according to a first embodiment to which the present invention is applied.

FIG. 1 is a block diagram showing a schematic structure of a communication system 1 to which the invention is applied. The communication system 1 is designed to be mounted on a vehicle such as an automobile. As shown in FIG. 1, the communication system includes a plurality of communication lines 5, 6, 7, all of which are connected to each of a plurality (two in this embodiment) of communication ECUs (communication devices) 10, 40. The "ECU" stands for Electrical Control Unit.

The communication ECU 10 includes a microcomputer 11 and a plurality of transceivers 21, 23, 25, 27. The microcomputer 11 is constructed into a known microcomputer having CPU, RAM, ROM, and a controller (these are not shown in the drawings). Each of the plurality of transceivers 21, 23, 25, 27 has the same construction as a known transceiver that is capable of CAN (Control Area Network) communication standardized under ISO11898-1.

The transceivers are used for communications in this embodiment in order to ensure smooth communications in the environment involving a lot of noise in the communication lines 5, 6, 7 caused by a motor mounted on, for example, a electric automobile or a hybrid car. Further, in this embodiment, CAN or similar device is used as a physical layer for data transmission, and the common clock synchronization communication system is used as the data communication method.

The microcomputer (CPU) 11 of the communication ECU 10 controls the transceivers 21, 23, 25 by running communication software stored in memory such as ROM, and controls each part of a vehicle by running vehicle control software. The communication ECU 10 communicates with the other communication ECU 40 through the communication lines using the transceivers 21, 23, 25, 27. It should be noted that the communication ECU 10 may be adapted to control a vehicle with a combination of the other communication ECU 40 by transmitting data between them through the communication lines 5, 6, 7, or it may be adapted to control the vehicle by itself by directly inputting detection signals from various sensors without using the communication lines 5, 6, 7.

The communication ECU 10 is constructed to perform a known clock synchronization communication in which all of the communication ECUs (the communication ECUs 10, 40 in this embodiment) conduct communications by synchronizing with a clock signal. The communication ECU 10 functions as a master device that outputs a clock signal to be used as the communication reference.

The microcomputer 11 of the communication ECU 10 has the feature of outputting a clock signal that is output from a clock output port 12 (a clock transmission means). The microcomputer 11 further includes a clock input port 13, a data output port 14 for sending data to outside component, and a data input port 15 for inputting data from outside component. The microcomputer 11 inputs a clock signal from the clock input port 13 (a clock reception means), and sends and receives data through the data output port 14 and the data input port 15 respectively on the basis of the clock signal (a data transmission/reception means).

The transceivers 21, 23, 25, 27 are placed on a single integrated circuit 61 in positions corresponding to respective ports 12, 13, 14, 15. The transceiver for sending clock signal 21 (a clock transmission means) among the plurality of transceivers changes a clock signal sent from the microcomputer 11 into a bus signal for a bus in the clock communication line 5, 70, and send it to the clock communication line 70 (for output) through a clock output terminal 22 prepared for transmission.

The transceiver for receiving clock signal 23 (a clock reception means) receives the bus signal from the clock communication line 5 (for input) through a clock input terminal 24 prepared for reception, and changes it into a reception signal that the communication ECU 10 can control, before sending it to the microcomputer 11. The clock communication line for output 70 connected to the transceiver for sending clock signal 21 and the clock communication line for input 5 connected to the transceiver for receiving clock signal 23 are tied at a midpoint 8 between the communication ECUs 10, 40.

The transceiver for sending data 25 (a data transmission/reception means) changes a data transmission signal sent from the microcomputer 11 into a bus signal for a bus in the data communication line 6, and send it to the data communication line 6 through a data output terminal 26 prepared for transmission. The transceiver for receiving data 27 (a data transmission/reception means) receives the bus signal from the data communication line 7 through a data input terminal 26 prepared for reception, and changes it into a reception signal that the communication ECU 10 can control, before sending it to the microcomputer 11.

It should be understood from the above description that the communication system 1 has a structure in which fully duplexed communications can be achieved using two data communication lines 6, 7.

The communication ECU 40 includes a microcomputer 41 and a plurality of transceivers 53, 55, 57, all of which are placed on a single integrated circuit 62, like the communication ECU 10. The communication ECU 40 has the structure of a slave device without having the feature of outputting a clock signal, and the remaining structure other than the feature of outputting the clock signal is the same as that of the communication ECU 10.

In particular, the microcomputer 41 includes a clock input port 42 for inputting a clock signal, a data output port 43 for outputting data to outside component, and a data input port 44 for inputting data from outside component. The clock communication line 5 is connected to the clock input port 42 through both a clock input terminal 54 and the transceiver for receiving clock signal 53 (a clock reception means) both provided in the communication ECU 40.

The data communication line 6 connected to the data output terminal 26 in the communication ECU 10 is connected to the date input port 44 through both the data input terminal 58 and the transceiver for receiving data 57 (a data transmission/reception means) both provided in the communication ECU 40. The data communication line 7 connected to the data input terminal 28 in the communication ECU 10 is connected to the data output port 43 through both a data output terminal 56 and the transceiver for sending data 55 (a data transmission/reception means) both provided in the communication ECU 40.

With this structure the microcomputer 11 of the communication ECU 10 (the master device) outputs a clock signal whose signal level varies, for example, from a high level to a low level or vice versa at a regular interval (which is defined by T0 in this embodiment). Then the communication ECU 40 (the slave device) sends data based on the received clock signal. Specifically, the ECU 40 sends data that synchronizes to a clock edge i.e., a falling edge of the received clock signal is used as a reference timing (transmission/reception reference) in this embodiment. Meanwhile, when the communication ECU 10 detects the subsequent edge of the clock signal i.e., a rising edge of the clock signal, the ECU 10 acquire the signal at the data input port 15 as the data that the ECU 40 sent at the falling edge in the same regular interval T0.

This indicates that in order to synchronize between the communication ECUs 10, 40 in the communication system 1, the communication ECU 10 has to be designed to receive data from the communication ECU 40 within the interval T0 from the reference timing i.e., falling edge at the communication ECU 10. Therefore, a time lag has to be reduced. The time lag refers to the difference between the reference timing of the communication ECU 10 (the master device) and the reference timing of the communication ECU 40 (the slave device).

In the communication ECU 10 of the communication system 1 according to this embodiment, the reference timing (starting point T0) is determined based on the time at which the communication ECU 10 receives a clock signal that has once been output to the clock communication line 70.

Figure 2:
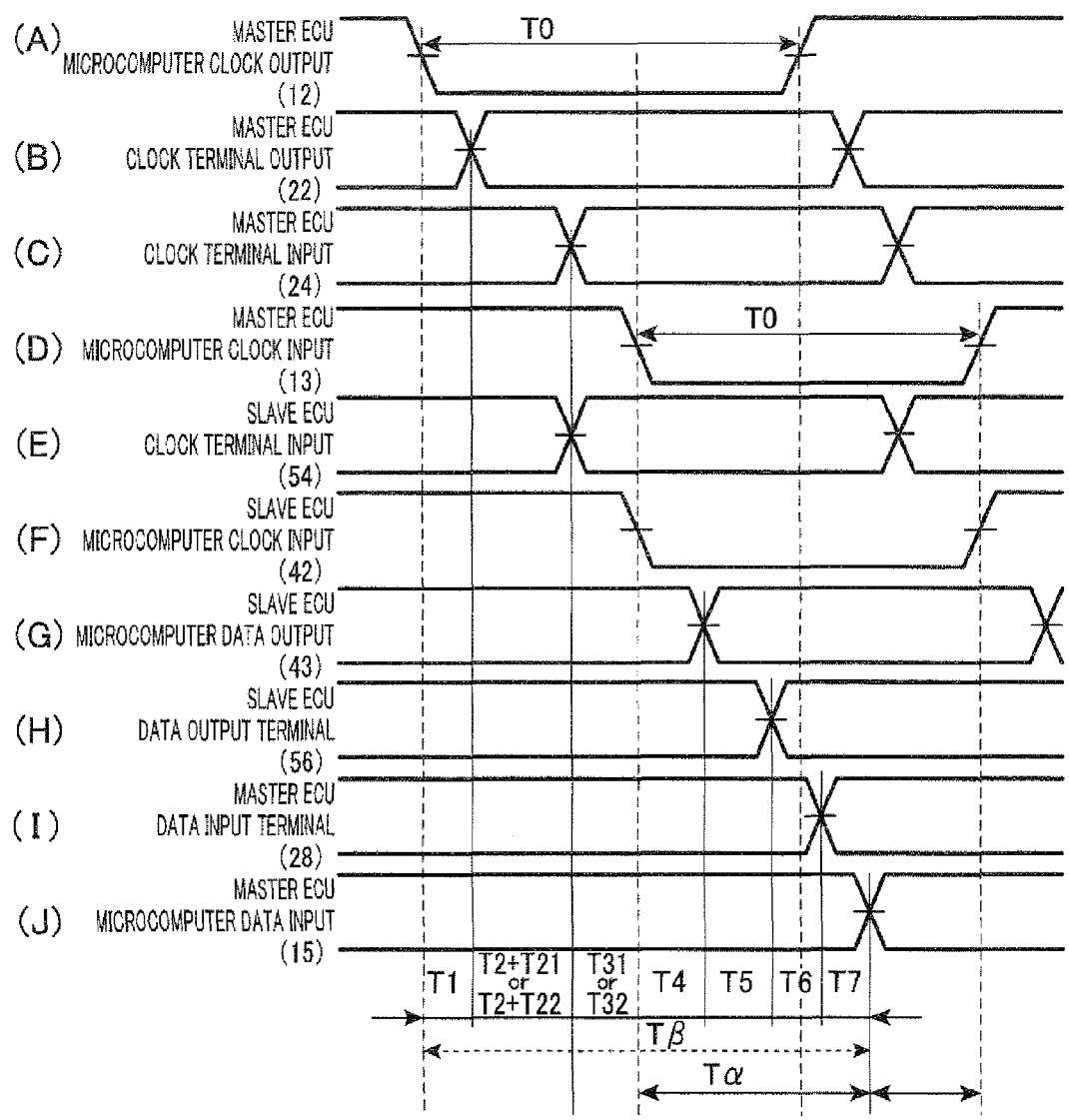
FIG. 2 is a timing chart showing the timing at which data are sent and received by the communication system of the first embodiment of the invention.

The clock signal and the time delay of data in this communication system 1 will be examined below. FIG. 2 is a timing chart showing the timing of data being sent and received in the communication system 1.

As illustrated in FIG. 2, when the microcomputer 11 of the communication ECU 10 outputs a clock signal, which varies between a high level to a low level, from the clock output port 12 (A), the clock signal reaches the clock output terminal 22 through the transceiver for sending clock signal 21 with a delayed time of T1 (B). The delay T1 occurs because of the time needed for processing in the transceiver 21 and for transmission through a communication line. When the clock signal is sent from the clock output terminal 22 to the clock input terminal 24 of the communication ECU 10, the delay times T2 and T22 are incurred, depending on the length of the clock communication lines 5, 70 (C). The delay time T2 is the time needed for the clock signal to be sent from the clock output terminal 22 to the midpoint 8, and the delay time T22 is the time needed for the clock signal to be sent from the midpoint 8 to the clock input terminal 24.

A further delay time T32 is incurred when the clock signal is input to the clock input port 13 through the transceiver for receiving clock signal 23 in the communication ECU 10, caused by the time needed for process in the transceiver 23 and for transmission through a communication line (D). In this embodiment, the reference timing of the communication ECU 10 in sending and receiving data is determined by the time at which the microcomputer 11 of the ECU 10 detects that the clock signal is input to the clock input port 13.

On the other hand, when the clock signal is sent from the clock output terminal 22 to the clock input terminal 54 of the communication ECU 40, the delay T2 plus T21 is incurred, depending on the length of the clock communication lines 5, 70. T2 is the time needed for the clock signal to be sent from the clock output terminal 22 to the midpoint 8, and T21 is the time needed for the clock signal to be sent from the midpoint 8 to the clock input terminal 54. The clock communication line for output 70 is connected to the midpoint 8 of the clock communication line for input 5, so that the time T21 and T22 are substantially the same.

A further delay time T31 occurs when the clock signal is input to the clock input port 42 through the transceiver for receiving clock signal 53 in the communication ECU 40, caused by the time needed for process in the transceiver 53 and for transmission through a communication line (F). The reference timing of the communication ECU 40 in sending and receiving data is determined by the time at which the clock signal is input to the clock input port 42. Accordingly, as shown in FIG. 2, the clock signals arriving to the clock ports 13, 42 (i.e., (D) and (F) in FIG. 2) have substantially the same clock phase.

Another delay T4 occurs caused by process for outputting data in the communication ECU 40 (G). Further, delays T5, T6 plus T7 are incurred for the data to reach the date input port 15 of the communication ECU 10 after it is output from the data output port 43 of the communication ECU 40. T5 is the time needed for process in the transceiver for sending data 55 and for transmission through a communication line (H). T6 is the time required for transmission through the communication line 7 (I). And, T7 is the time needed for process in the transceiver for receiving data 27 and for transmission through a communication line (J).

In order to synchronize between the communication ECUs 10, 40 in this communication system 1, the relationship shown by the following formula has to be satisfied.

$$T0 > T21 + T31 - (T22 + T32) + T4 + T5 + T6 + T7$$

In this embodiment, in particular, the following relationship is determined.

$$T21 + T31 \approx T22 + T32$$

Therefore, it is understood that the following relationship has to be acquired.

$$T0 > T4 + T5 + T6 + T7 (= T\alpha)$$

Figure 4:
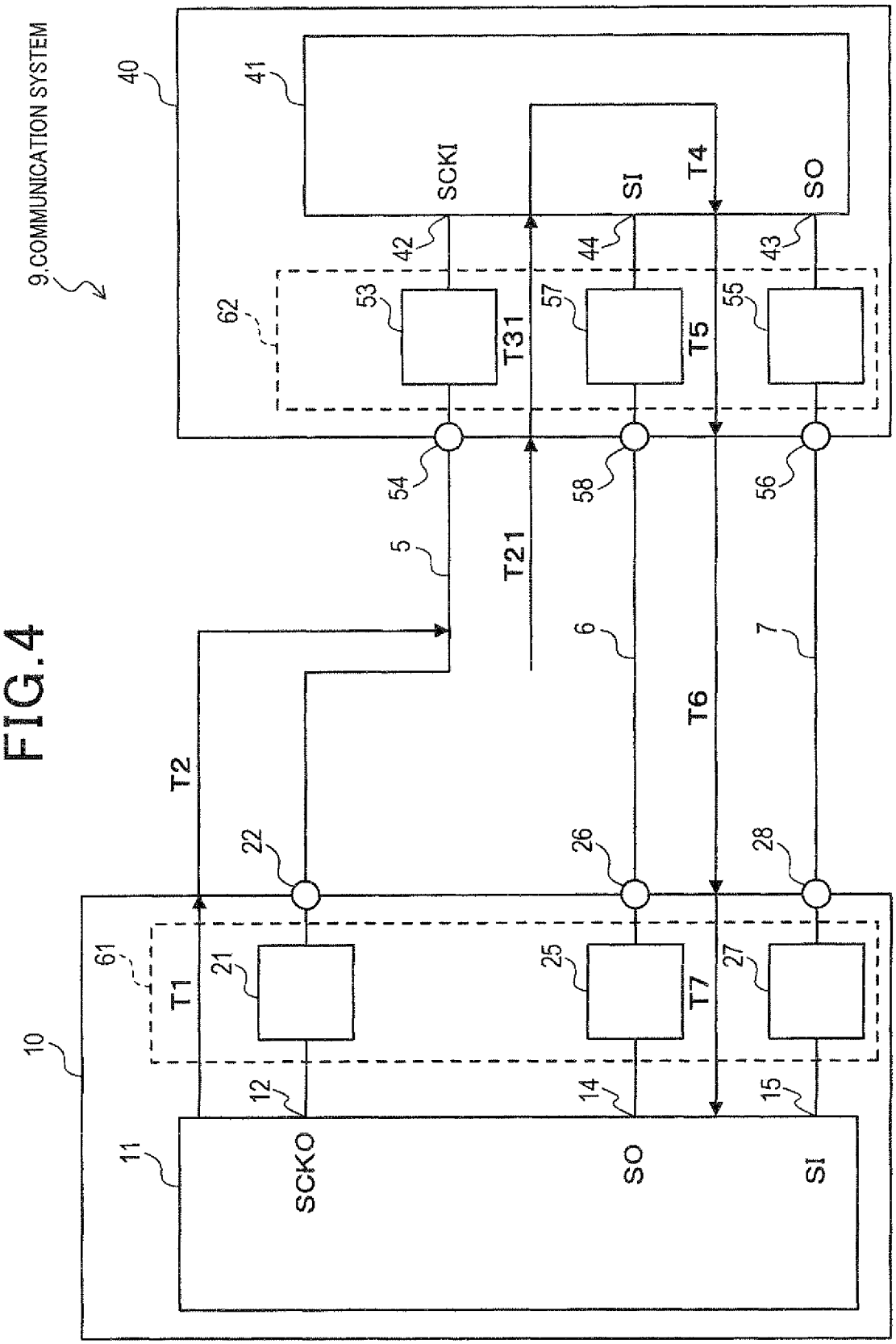
FIG. 4 is a block diagram showing a schematic structure of a comparative communication device.

FIG. 4 shows a schematic structure of a comparative example of a communication system 9. This communication system 9 does not include the feature of inputting a clock signal to the communication ECU 10 (the master device). In other words, the communication ECU 10 does not have the clock input port 13, transceiver for receiving clock signal 23, and clock input terminal 24.

Thus, the reference timing (starting point T0) in the communication ECU 10 of the communication system 9 is determined based on the time at which a clock signal is output from the clock output port 12. The communication ECU 10 in the comparative communication system 9 is dissimilar to that of the communication system 1 according to the embodiment of the invention in that the comparative system 9 is not designed to determine the reference timing based on the time at which the clock signal, which has once been output in the communication line 5, is received.

The delays of clock signal and data in the comparative communication system 9 will be examined below. In order to synchronize between the communication ECUs 10, 40 in the communication system 9, the following relationship has to be satisfied.

$$T0 > T1 + T2 + T21 + T31 + T4 + T5 + T6 + T7 (= T\beta)$$

It is understood from the above formula that the delay time in the communication system 1 according to the embodiment of the invention is shorter than that of the comparative communication system 9 by the amount shown in the following formula.

$$T1 + T2 + T22 + T33$$

Actual delayed time in each interval is estimated as such as shown in the following formula.

$$T1 = T31 = T32 = T5 = T7 = 140 \text{ ns}$$

$$T2 = T21 = T22 = 10 \text{ ns}$$

T4=75 ns

T6=20 ns

According to this estimation, it is understood that the time lag of the reference signal between the communication ECUs 10, 40 in the communication system 1 according to the embodiment of the invention can be reduced by 300 ns compared to that of the comparative communication system 9.

In the communication system 1 of the embodiment of the invention described above in detail, the communication ECU 10 (the master device) is designed to send a clock signal to the clock communication line 5 (70) (among the plurality of communication lines 5, 6, 7) through the transceiver for sending clock signal 21, and the clock signal is used for the communication ECUs 10, 40 to synchronize with each other when sending and receiving data. Then, the communication ECUs 10, 40 receive the clock signal from the clock communication line 5 through the transceivers for receiving clock signal 23, 53. Consequently, the communication ECUs 10, 40 send to/receive from the data communication lines 6, 7 (and not the dock communication line 5) through the receivers for sending data 25, 55 and the transceivers for receiving data 27, 57 using the received clock signal as the reference timing (transmission/reception reference) for sending and receiving the data.

According to the communication system 1, all (both) of the communication ECUs 10, 40 used for sending and receiving data utilize the clock signal received from the clock signal lines as the transmission/reception reference, so that the amount of time lag in the transmission/reception reference between the communication ECUs 10, 40 can be reduced, compared to a system having the communication ECUs 10, 40 in which the transmission/reception reference is determined based on the time at which the clock signal is sent. Further, the communication system 1 of the invention can be reduced in its production cost since the system 1 can exclude a circuit to be exclusively used for the correction of time lag.

The transceiver 23 forming a part of the circuit for receiving a clock signal and a transceiver 25 for sending data are mounted on the single integrated circuit 61, and the transceiver 53 for receiving a clock signal and the transceiver for sending data 55 are mounted on the other integrated circuit 62. The transceiver for sending clock signal 21 is also mounted on the same integrated circuit 61.

According to such a communication system 1, the plurality of transceivers for sending/receiving data (and clock signals) using the communication lines 5, 6, 7 are included in the individual integrated circuits 61, 62, so that the characteristics of respective transceivers can be conformed. Moreover, such a construction can conform the delay time of data in each of the transceivers thereby enabling to attain reliable communication.

In the communication ECU 10 of the communication system 1, the transceiver for sending clock signal 21 and the transceiver for receiving clock signal 23 are individually connected to the respective clock communication lines 5 and 70. The clock communication line 70 connected to the transceiver for sending clock signal 21 is connected, at the midpoint 8 between the communication ECUs 10, 40, to the clock communication line 5 to which the transceivers for receiving clock signal 23, 53 of the communication ECUs 10, 40 are connected.

The communication system 1 having such a construction allows the communication ECUs 10, 40 to detect the clock signal substantially at the same time. That is, in this system 1, the transmission/reception reference of the communication ECU 10 can come closer to the transmission/reception reference of the communication ECU 40 by the amount of time in which the clock signal transmits through the clock communication line 5. This can contribute to reduce the amount of time lag in the transmission/reception reference between the communication ECUs 10, 40.

(Second Embodiment)

A communication system 2 according to the invention with a modified construction will be described below. In this second embodiment, only components different from the communication system 1 in the first embodiment will be described, while components included in the first embodiment will be omitted from the description and be provided with the same references.

Figure 3:
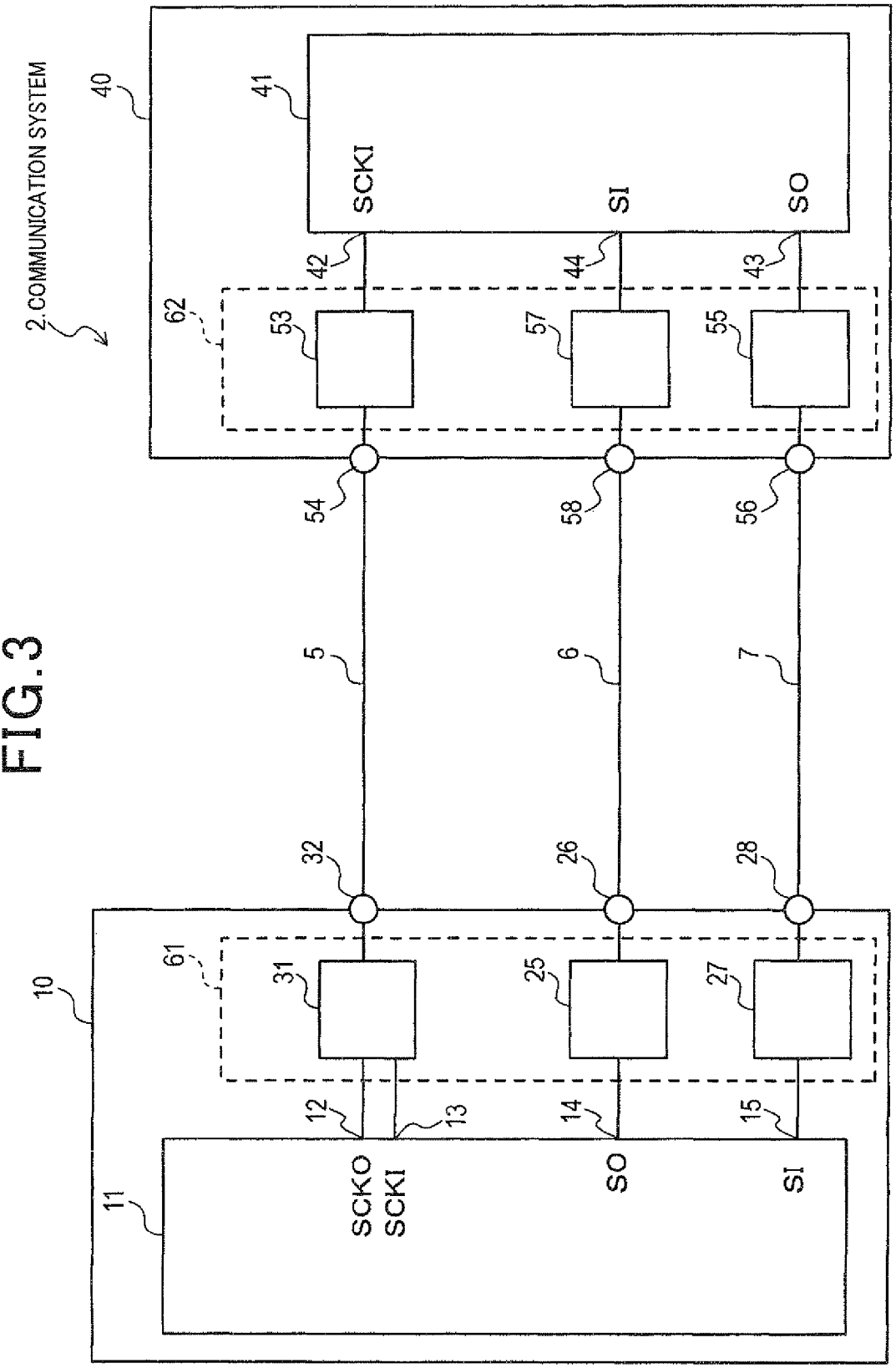
FIG. 3 is a block diagram showing a schematic structure of a communication device according to a second embodiment of the invention.

FIG. 3 is a block diagram showing a schematic structure of the communication system 2 according to the second embodiment.

The communication ECU 10 in the second embodiment includes a transceiver for clock transmission/reception 31 capable of sending and receiving a clock signal. The transceiver 31 has the feature of both the transceiver for receiving clock signal 23 (data transmission/reception means) and the receiver for sending clock signal 21.

This transceiver 31 is constructed so as to be able to send signals like a known transceiver used in CAN and to detect signal level of a connected bus (the clock communication line 5 in this embodiment).

According to this communication system 2, a composition for sending and receiving a clock signal in the communication ECU 10 (master device) is formed with a single transceiver, which can reduce a number of transceivers to be used compared to a system in which individual transceivers are needed for both sending and receiving a clock signal. This can reduce the production cost of the communication system 2.

The communication system 2 with such a structure can also reduce the delay time of a clock signal and data compared to the comparative communication system 9.

(Other Embodiments)

The present invention is not limited to those embodiments described above, and may include various types of constructions within the technical scope of the invention.

For example, the above described embodiments are the communication system having two communication ECUs 10, 40, but the invention can include the system having three or more communication ECUs. In the communication system having three or more communication ECUs, additional communication ECU(s) (slave device) should be included in this system, and a known chip-select input and transceiver corresponding to each chip-select input should be provided to each ECU, and a communication line for connecting transceivers corresponding to respective chip select input in each ECU should be provided.

The system having such a structure can also provide the same advantages as the embodiments of the invention described hereinbefore.

What is claimed is:

1. A communication system comprising a plurality of communication devices each of which is connected with a plurality of communication lines, the communication system comprising:

a clock transmission means for sending a clock signal to a clock communication line by a master device, the master device is selected from the plurality of communication devices, the clock communication line is selected from the plurality of communication lines, the clock signal is used to synchronize the plurality of communication devices when sending and receiving data;

a clock reception means for receiving the clock signal from the clock communication line, the clock signal is received by all of the communication devices, the all of the communication devices send and receive data through data communication lines, the data communication lines are selected from the plurality of communication lines excluding the clock communication line; and a data transmission/reception means for sending and receiving data through the data communication lines, the data is sent and received according to a reference timing, the reference timing is designated as a transmission/reception reference, the reference timing is determined by the time that the clock signal is received, wherein the master device comprises the clock reception means and the data transmission/reception means, and further comprises a single transceiver with which the clock transmission means sends a clock signal and the clock reception means receives the clock signal.

2. The communication system according to claim 1, wherein the clock reception means and the data transmission/reception means configured to be included in at least one of the communication devices are at least partially mounted on a single integrated circuit.

3. The communication system according to claim 1, wherein the clock communication line through which the clock transmission means sends a clock signal is connected to a midpoint of the clock communication line through which each of the communication devices receives the clock signal.

4. The communication system according to claim 2, wherein the clock communication line through which the clock transmission means sends a clock signal is connected to a midpoint of the clock communication line through which each of the communication devices receives the clock signal.

5. A communication device among the plurality of communication devices in the communication system in claim 1, each of which is connected with the plurality of communication lines, wherein the communication device is constructed as the master device of the communication system.

6. Communication devices in the communication system in claim 1, each of which is connected with the plurality of communication lines, wherein the communication devices excluding the master device are constructed as regular communication devices.

7. A communication system comprising a plurality of communication devices each of which is connected with a plurality of communication lines, the communication system comprising:

a clock signal transmitter configured to send a clock signal to a clock communication line by a master device, the master device is selected from the plurality of communication devices, the clock communication line is selected from the plurality of communication lines, the clock signal is used to synchronize the plurality of communication devices when sending and receiving data;

a clock signal receiver configured to receive the clock signal from the clock communication line, the clock signal is received by all of the communication devices, the all of the communication devices are configured to send and receive data through data communication lines, the data communication lines are selected from the plurality of communication lines excluding the clock communication line; and a data transmitter/receiver configured to send and receive data through the data communication lines, the data is sent and received according to a reference timing, the reference timing is designated as a transmission/reception reference, the reference timing is determined by the time that the clock signal is received, wherein the master device comprises the clock signal receiver and the data transmitter/receiver, and further comprises a single transceiver with which the clock signal transmitter is configured to send a clock signal and the clock signal receiver is configured to receive the clock signal.

8. The communication system according to claim 7, wherein the clock signal receiver and the data transmitter/receiver are configured to be included in at least one of the communication devices are at least partially mounted on a single integrated circuit.

9. The communication system according to claim 7, wherein the clock communication line through which the clock signal transmitter sends a clock signal is connected to a midpoint of the clock communication line through which each of the communication devices receives the clock signal.

10. The communication system according to claim 8, wherein the clock communication line through which the clock signal transmitter sends a clock signal is connected to a midpoint of the clock communication line through which each of the communication devices receives the clock signal.

11. A communication device among the plurality of communication devices in the communication system in claim 7, each of which is connected with the plurality of communication lines, wherein the communication device is constructed as the master device of the communication system.

12. Communication devices in the communication system in claim 7, each of which is connected with the plurality of communication lines, wherein the communication devices excluding the master device are constructed as regular communication devices.

* * * * *